United States Patent
Roes et al.

(10) Patent No.: US 7,831,150 B2
(45) Date of Patent: Nov. 9, 2010

(54) SECURE COVERT COMBAT IDENTIFICATION FRIEND-OR-FOE (IFF) SYSTEM FOR THE DISMOUNTED SOLDIER

(75) Inventors: John B. Roes, San Diego, CA (US); Deepak Varshneya, Del Mar, CA (US)

(73) Assignee: Cubic Defense Systems, Inc., San Diego, CA (US)

(*) Notice: Subject to any disclaimer, the term of this patent is extended or adjusted under 35 U.S.C. 154(b) by 224 days.

(21) Appl. No.: 11/953,792

(22) Filed: Dec. 10, 2007

(65) Prior Publication Data

US 2009/0058712 A1 Mar. 5, 2009

Related U.S. Application Data

(63) Continuation of application No. 10/066,099, filed on Feb. 1, 2002, now Pat. No. 7,308,202.

(51) Int. Cl.
*H04B 10/00* (2006.01)
*H04B 10/02* (2006.01)

(52) U.S. Cl. .................. 398/130; 398/108; 398/118; 398/151; 398/169; 398/170; 342/45; 434/4

(58) Field of Classification Search .................. 398/108, 398/118–131, 151, 169, 170; 342/45; 434/4
See application file for complete search history.

(56) References Cited

U.S. PATENT DOCUMENTS

| | | |
|---|---|---|
| 4,097,141 A | 6/1978 | Warner |
| 4,143,263 A | 3/1979 | Eichweber |
| 4,777,660 A | 10/1988 | Gould et al. |

(Continued)

FOREIGN PATENT DOCUMENTS

EP    1536401 A    6/2005

(Continued)

OTHER PUBLICATIONS

U.S. Appl. No. 11/140,473, filed May 27, 2005, Varshneya, et al.

(Continued)

*Primary Examiner*—Ken N Vanderpuye
*Assistant Examiner*—Daniel G Dobson
(74) *Attorney, Agent, or Firm*—Townsend and Townsend and Crew, LLP

(57) ABSTRACT

A combat IFF system, for use in a combat exercise or on the battlefield, including a helmet-mounted passive IFF response unit and a weapon-mounted IFF interrogatory unit for each soldier. Infrared (IR) signals are employed for both challenge and response. The IR response signal is a very narrowly-targeted reflection of the relatively narrow IR transmit signal, thereby minimizing interception opportunities. The transmit and response signals are encoded in a transaction that cannot be compromised even when either or both signals are intercepted and decoded by the enemy. The combat IFF system includes biometric anti-spoofing features that prevent any use by an enemy in possession of captured units. Military radio-frequency (RF) spectrum is not required so there are no bandwidth limitations on simultaneous IFF transactions in the battlefield. A combat IFF transaction is completed in milliseconds.

15 Claims, 9 Drawing Sheets

U.S. PATENT DOCUMENTS

| | | | |
|---|---|---|---|
| 4,837,575 A * | 6/1989 | Conner, Jr. ............... | 342/45 |
| 4,866,781 A | 9/1989 | Borken et al. | |
| 4,937,795 A | 6/1990 | Motegi et al. | |
| 4,983,021 A | 1/1991 | Fergason | |
| 5,015,096 A | 5/1991 | Kowalski et al. | |
| 5,083,866 A | 1/1992 | Dey | |
| 5,117,305 A | 5/1992 | Dey | |
| 5,121,242 A | 6/1992 | Kennedy | |
| 5,136,602 A | 8/1992 | Sugawara | |
| 5,144,397 A | 9/1992 | Tokuda et al. | |
| 5,173,643 A | 12/1992 | Sullivan | |
| 5,274,379 A * | 12/1993 | Carbonneau et al. ......... | 342/45 |
| 5,299,227 A | 3/1994 | Rose | |
| 5,306,925 A | 4/1994 | Abe et al. | |
| 5,426,295 A | 6/1995 | Parikh et al. | |
| 5,448,045 A | 9/1995 | Clark | |
| 5,448,847 A | 9/1995 | Teetzel | |
| 5,459,470 A | 10/1995 | Wootton et al. | |
| 5,476,385 A | 12/1995 | Parikh et al. | |
| 5,539,565 A * | 7/1996 | Waddoups et al. ......... | 398/170 |
| 5,589,981 A | 12/1996 | Kasser et al. | |
| 5,648,862 A | 7/1997 | Owen | |
| 5,668,386 A | 9/1997 | Makiuchi et al. | |
| 5,686,722 A | 11/1997 | Dubois et al. | |
| 5,819,164 A | 10/1998 | Sun et al. | |
| 5,822,430 A * | 10/1998 | Doud ........................ | 380/260 |
| 5,870,215 A * | 2/1999 | Milano et al. ............... | 398/108 |
| 5,966,226 A * | 10/1999 | Gerber ...................... | 398/108 |
| 5,966,227 A | 10/1999 | Dubois et al. | |
| 6,005,276 A | 12/1999 | Forrest et al. | |
| 6,055,087 A | 4/2000 | Kwon et al. | |
| 6,097,330 A | 8/2000 | Kiser | |
| 6,154,299 A | 11/2000 | Gilbreath et al. | |
| 6,229,165 B1 | 5/2001 | Sakai et al. | |
| 6,450,816 B1 | 9/2002 | Gerber | |
| 6,493,123 B1 | 12/2002 | Mansell et al. | |
| 6,518,572 B1 | 2/2003 | Kishii et al. | |
| 6,545,805 B2 | 4/2003 | He et al. | |
| 6,646,292 B2 | 11/2003 | Steigerwald et al. | |
| 6,736,518 B1 | 5/2004 | Belt et al. | |
| 6,836,351 B2 | 12/2004 | Livingston et al. | |
| 7,213,942 B2 | 5/2007 | Jiang et al. | |
| 7,308,202 B2 | 12/2007 | Roes et al. | |
| 7,333,735 B1 | 2/2008 | Goorjian | |
| 2001/0013967 A1 | 8/2001 | Tsumura | |
| 2001/0035723 A1 | 11/2001 | Pelrine | |
| 2001/0035995 A1 | 11/2001 | Ruggiero | |
| 2003/0048533 A1 | 3/2003 | Lyons, III | |
| 2003/0147651 A1 | 8/2003 | Roes et al. | |
| 2003/0227681 A1 | 12/2003 | Currie | |
| 2004/0075880 A1 | 4/2004 | Pepper et al. | |
| 2006/0054899 A1 | 3/2006 | Takahashi et al. | |
| 2006/0180830 A1 | 8/2006 | Kambiz et al. | |
| 2007/0127928 A1 | 6/2007 | Varshneya et al. | |
| 2008/0217602 A1 | 9/2008 | Kahen | |

FOREIGN PATENT DOCUMENTS

| | | |
|---|---|---|
| GB | 2366872 A | 3/2002 |
| JP | 4263475 | 9/1992 |
| JP | 2000/299489 A | 10/2000 |
| WO | WO 99/57789 A | 11/1999 |
| WO | WO 03075493 A | 9/2003 |

OTHER PUBLICATIONS

U.S. Appl. No. 11/295,849, filed Dec. 7, 2005, Varshneya et al.
U.S. Appl. No. 12/171,803, filed Jul. 11, 2008, Dadkhah, et al.
U.S. Appl. No. 12/171,837, filed Jul. 11, 2008, Dadkhah, et al.
Hong, Y.K., et al. "Corner Cube Reflectors by Surface Tension Self-Assembly", Imperial College London; UC Berkeley, [undated] pp. 1-2.
Hong, Y.K., et al. Design, fabrication and test of self-assembled optical corner cube reflector', *J. Micromech. Microeng.* (2005) 15:663-672.
Rabinovich, .W.S., et al. "InGaAs Multiple Quantum Well Modulating Retro-reflector for Free Space Optical Communications", US Naval Research Laboratory, Washington, D.C. 20375 [undated].
Rabinovich, .W.S., et al. "Cat's eye modulating retro-reflectors for free-space optical data transfer", [undated].
Rabinovich, .W.S., et al. Free-Space Optical Link with Low Alignment Sensitivity using the 1553 Protocol', [undated].
Rarity, J.G., et al. "Ground to satellite secure key exchange using quantum cryptography", *New Journal of Physics* (2002) 4:82.1-82. 21.
Office Action dated Dec. 16, 2005 in U.S. Appl. No. 11/140,473.
Office Action dated Apr. 16, 2008 in U.S. Appl. No. 11/295,849.
Office Action dated Dec. 29, 2008 in U.S. Appl. No. 11/295,849.
Office Action dated Jul. 1, 2009 in U.S. Appl. No. 11/295,849.
PCT International Search Report and Written Opinion mailed Oct. 10, 2008, Application No. PCT/US2008/069874, 15 pages.
PCT International Search Report and Written Opinion mailed Nov. 13, 2008, Application No. PCT/US2008/069888, 14 pages.
PCT International Search Report and Written Opinion mailed Feb. 13, 2009; International Application No. PCT/US2008/069875, 21 pages.
PCT International Search Report mailed Dec. 30, 2009; International Application No. PCT/US2008/081618; 5 pages.

* cited by examiner (a)

(b)

(c)

(d)

SECURE COVERT COMBAT IDENTIFICATION FRIEND-OR-FOE (IFF) SYSTEM FOR THE DISMOUNTED SOLDIER

CROSS-REFERENCES TO RELATED APPLICATIONS

This application is a continuation of U.S. application Ser. No. 10/066,099, filed Feb. 1, 2002, entitled SECURE COVERT COMBAT IDENTIFICATION FRIEND-OR-FOE (IFF) SYSTEM FOR THE DISMOUNTED SOLDIER, hereby incorporated by reference in its entirety.

BACKGROUND OF THE INVENTION

1. Field of the Invention

This invention relates generally to combat identification systems for the dismounted soldier and more particularly to a secure covert identification as friend or foe (IFF) system for interrogating a dismounted soldier with a coded infrared (IR) signal that is selectively retroreflected and encoded by the target when recognized as a valid challenge.

2. Description of the Related Art

Dismounted Armed Forces have an interest in the remote and secure identification of a person as friend or foe, during combat training exercises and in armed conflicts. Identification as friend or foe (IFF) systems are well-known in the art for military aircraft and other weapons systems. Such systems are useful for preventing action against friendly forces. The military platform commanders on a modern battlefield must accurately identify potential targets as friend-or-foe (IFF) when detected within range of available weapon systems. Such target IFF presents a difficult decision for a military platform commander, who must decide whether to engage a detected target while avoiding accidental fratricide. This problem is even more difficult for the dismounted soldier who may be moving covertly through an unknown combat zone at night with limited visibility. Simple visual assessments of other dismounted soldiers is not a reliable IFF method for military platforms or dismounted infantry.

The art is replete with proposals for IFF systems for military platforms in modern land battlefields. But commanders often still rely on low-resolution visual and infrared images to identify detected targets. Commanders often must operate under radio silence to avoid detection by an enemy. With infrared (IR) imagers alone, the identification of individual dismounted soldiers is not feasible, although the IR signatures of land vehicles may have some use. IFF systems that require one or more radio signals are limited in channel-capacity and must bear the overhead of selecting and/or awaiting an available battlefield channel before completing the IFF task. Active-response systems require the emission of a signal by the unknown respondent in response to a verified challenge, which may compromise the security of both interrogator and respondent. Active transponders are subject to capture and may be used for spoofing by the enemy in a battlefield or a combat training environment. Passive response systems rely on the return of an echo (reflection) of a challenge signal to the interrogator, but simple reflection schemes are easily compromised and more elaborate passive reflection schemes are still subject to intercept, compromise or capture for use by the enemy in spoofing the interrogator.

As described in U.S. Pat. No. 4,851,849 by Otto Albersdoerfer, a typical active IFF technique for vehicles is to equip a military vehicle with a transponder that emits a coded return signal when an interrogating radar pulse is detected by its receiver. As described in U.S. Pat. No. 5,686,722 by Dobois et al., a more sophisticated active IFF technique for vehicles uses a selective wavelength optical coding system with tunable optical beacons mounted on each vehicle. By spreading the optical broadcast energy into frequency in a precise manner, the beacon identifies the host vehicle to friendly receivers while remaining covert to the enemy.

As described in U.S. Pat. No. 4,694,297 by Alan Sewards, a typical passive IFF technique for vehicles is to equip a military vehicle with a passive antenna that reflects an interrogatory radar beam while adding a distinctive modulation by varying the antenna termination impedance responsive to evaluation of the interrogatory beam. A more sophisticated passive electro-optical IFF system for vehicles is described in U.S. Pat. No. 5,274,379 by R. Carbonneau et al. wherein each friendly vehicle is provided with a narrow-beam laser transmitter and a panoramic detector. If a vehicle detects a coded interrogator laser beam and identifies the code as friendly, it opens a blocked rotating retro-reflector to clear a reflection path back to the source, where it can be identified by another narrow field-of-view detector. A further modulation is also added to the reflected beam to identify the reflecting vehicle as friendly. If an improperly coded beam is detected, the transmission path is not cleared, thereby preventing reflection of that beam and warning is sent to the vehicle commander of an unfriendly laser transmission. Others have proposed similar passive optical IFF systems for vehicles, including Wooton et al. in U.S. Pat. No. 5,459,470 and Sun et al. in U.S. Pat. No. 5,819,164.

The art is less populated with IFF proposals for the lone dismounted soldier (the infantryman on foot). Whether in actual combat or in a training exercise, the dismounted soldier operates with severe weight limits and little onboard electrical power. The friendly foot soldier has no distinctive acoustic, thermal or radar cross-section that may be used to assist in distinguishing friendlies from enemies. But some practitioners have proposing IFF solutions for the dismounted soldier, both active and passive. For example, in U.S. Pat. No. 6,097,330, Kiser proposes an active IFF system for identifying concentrations of ground troops (or individuals) from an aircraft by interrogating a (heavy) human-mounted radio transmitter carried by one of the group with a narrow-cast optical signal. As another example, in U.S. Pat. No. 5,299,277, Rose proposes a compact active IFF system to be carried by each individual dismounted soldier for use in combat exercises or on the battlefield. The system includes a clip-on beacon and a hand-held (flashlight-style) or weapon-mounted detector. The beacon radiates a spread-spectrum low-probability-of-intercept (LPI) signal at optical frequencies that are selected to be invisible to the usual detectors present in the battlefield. Rose doesn't consider the problem of spoofing with captured devices. As yet another example, in U.S. Pat. No. 5,648,862, Owen proposes an active IFF system implemented by adding provisions for coded two-way transmissions to the night-vision systems often worn by dismounted soldiers. As a final example, in U.S. Pat. No. 5,966,226, Gerber proposes an active combat IFF system for each dismounted soldier that includes a weapon-mounted laser projector for interrogating suspected targets and a harness including means for receiving the interrogatory signal and means for responding with an encoded radio, acoustic or optical signal. But these proposals do not resolve the spoofing problem (through capture of a beacon or harness, for example). and are not particularly covert because the responding target generally broadcasts an active signal either continuously or in response to interrogation. Any IFF proposal employing broadcast signals also faces a battlefield channel capacity (or channel availability delay) problem as well.

There is still a clearly-felt need in the art for an IFF system for the dismounted soldier that provides true passive covertness and that cannot be spoofed under any battlefield conditions. The desired IFF system requires little power and is adapted to prevent any use of captured equipment or intercepted signal codes. Finally, the system should be inexpensive enough to permit equipping every soldier with the necessary interrogation and response equipment for combat exercises or actual battlefield conditions. These unresolved problems and deficiencies are clearly felt in the art and are solved by this invention in the manner described below.

SUMMARY OF THE INVENTION

This invention solves the above-described problems by providing a system, for use in either a combat exercise or on the battlefield, that includes a passive helmet-mounted identification as friend or foe (IFF) response unit and a weapon-mounted IFF interrogatory unit for each soldier. Infrared (IR) signals are employed for both challenge and response. The IR response signal is a very narrowly-targeted reflection of the relatively narrow IR transmit signal, thereby minimizing interception opportunities. The transmit and response signals are encoded in a transaction that cannot be compromised even when either or both signals are intercepted and decoded by the enemy. The combat IFF system includes biometric security (anti-spoofing) features that prevent any use by an enemy soldier in possession of captured units. No military radio-frequency (RF) spectrum is used so there are no limitations on simultaneous IFF transactions in the battlefield. A combat IFF transaction is very brief and may be completed within the typical human reaction time interval.

It is a purpose of this invention to provide a secure covert combat IFF system adapted for use either in a combat exercise or on the battlefield. It is an advantage of this invention that the IFF transaction employs line-of-sight IR signals that are not likely to be surreptitiously intercepted. It is a feature of this invention that both transmit and response signals are encoded for security in a manner that prevents compromise even if one or both are intercepted and decoded by an enemy. It is another advantage of this invention that the response unit is entirely passive and cannot radiate any energy that may be intercepted.

It is another purpose of this invention to provide a combat IFF system having a reduced cost and weight without using any additional military RF spectrum. It is a feature of this invention that the response unit is integrated into the helmet of the dismounted soldier, adding little weight thereto. It is an advantage of this invention that the interrogatory unit and the response unit generally include commercial off-the-shelf (COTS) components available in quantity at relatively low cost and the response unit may be powered by a small lithium-ion battery for up to three years. It is another feature of this invention that the entire IFF transaction occurs in the optical spectrum, using no military RF spectrum.

It is yet another purpose of this invention to provide a combat IFF system that cannot be compromised by the enemy, whether by interception, spoofing or capture. It is a feature of this invention that the helmet-mounted response unit is automatically disabled upon doffing of the helmet and may be reactivated only by means of selected biometric data unique to the soldier fitted with the helmet; and similar provisions may be made for the interrogatory unit. It is an advantage of this invention that an IFF transaction cannot be compromised or spoofed even by an enemy in possession of both decoded signals together with captured interrogatory and response units.

In one aspect, the invention is a method for identifying as friend or foe a combat response unit having a helmet-mounted challenge receiver and a retroreflector obturator, including the steps of projecting an IR transmit signal including a transmitted code of the day (TCOD) onto the combat response unit from a combat interrogatory unit, receiving the IR transmit signal and TCOD at the challenge receiver, selectively reflecting the IR transmit signal by opening and closing the retroreflector obturator according to a response code of the day (RCOD), receiving the reflected IR transmit signal and RCOD at the combat interrogatory unit, and combining the received RCOD with the TCOD to identify the combat response unit as friend or foe.

In a preferred embodiment, the invention is a system for combat IFF communications including a combat interrogatory unit having projector means for projecting an IR transmit signal including a TCOD, receiver means for receiving a reflected IR transmit signal including a RCOD, and means for combining the received RCOD with the TCOD to identify the source of the reflected IR transmit signal as friend or foe; and a helmet-mounted combat response unit having sensor means for receiving a projected IR transmit signal including the TCOD, retroreflector means for reflecting an incoming IR transmit signal generally back along the incoming path thereof, obturator means for obstructing the retroreflector means to prevent reflection thereby, and means for opening and closing the obturator means according to the RCOD.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

DESCRIPTION OF THE PREFERRED EMBODIMENT

Figure 1:
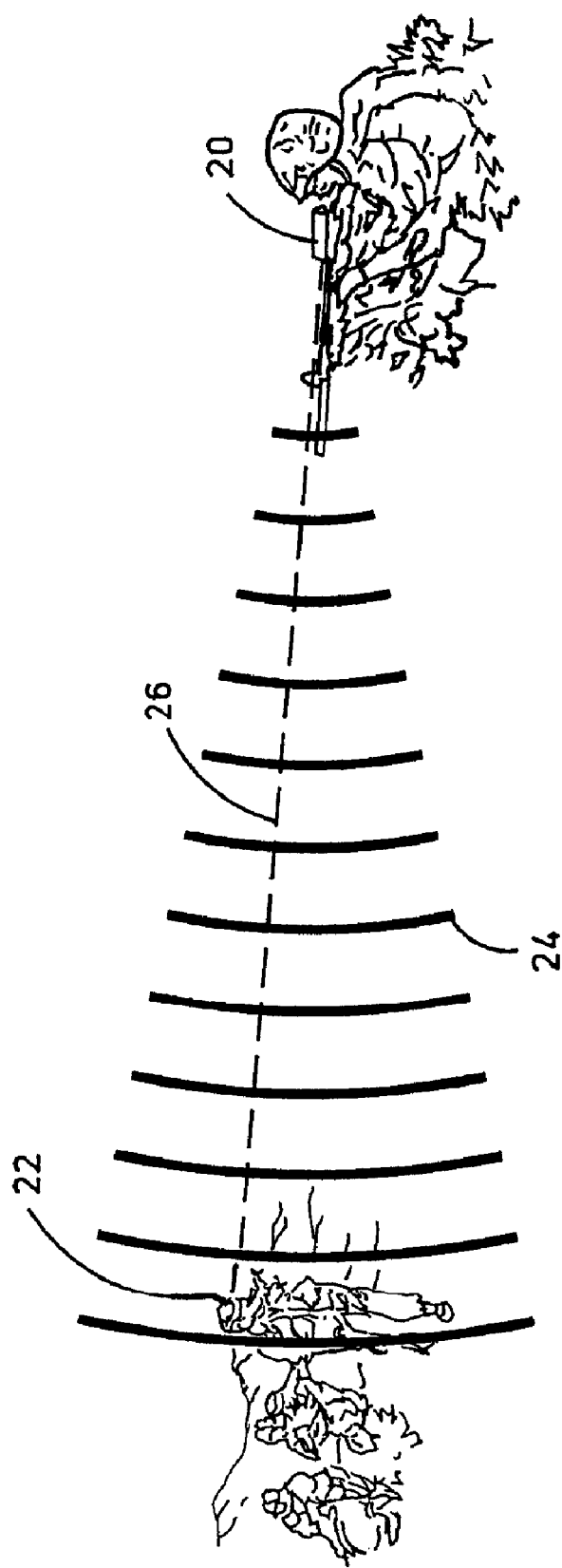
FIG. 1 is a sketch illustrating the operation of the combat identification as friend or foe (IFF) system of this invention.

FIG. 1 illustrates the operation of the combat identification as friend or foe (IFF) system of this invention. The combat interrogatory unit 20 of this invention is shown in a preferred weapon-mounted disposition where the challenging soldier may target the helmet-mounted combat response unit 22 of this invention worn by a soldier in a combat simulation exercise or in actual combat. An infrared (IR) transmit signal 24 is projected by unit 20 upon operator command. Transmit signal 20 radiates outward along a narrow beam, eventually illuminating response unit 22. For example, transmit signal 24 may be embodied as a 6 milliradian beam of 1540 nm IR light, which then illuminates an area of about 6 meters on a side at a typical weapon range limit of 1000 meters. Upon being received, detected and verified at response unit 22, transmit signal 24 is then retroreflected back to interrogatory unit 20 as the response signal 26. For a 6 milliradian transmit signal 24, response signal 26 includes a reflection of, for example, a 1.5 centimeter portion of the 6 meter transmit beam 24. This 1.5 cm reflected portion includes about 0.002 percent (−47 dB) of the initial energy of transmit signal 24, which is generally reflected back to interrogatory unit 20 by a precision retroreflector (see FIGS. 2 and 5). Response signal 26 is received at interrogatory unit 20 reduced by an additional −8 dB, which leaves sufficient power for IFF detection and processing at interrogatory unit 20. The 1540 nm signal wavelength is preferred because it is eye-safe and has relatively low absorption and scattering loss in the usual battlefield smoke and haze.

Figure 2:
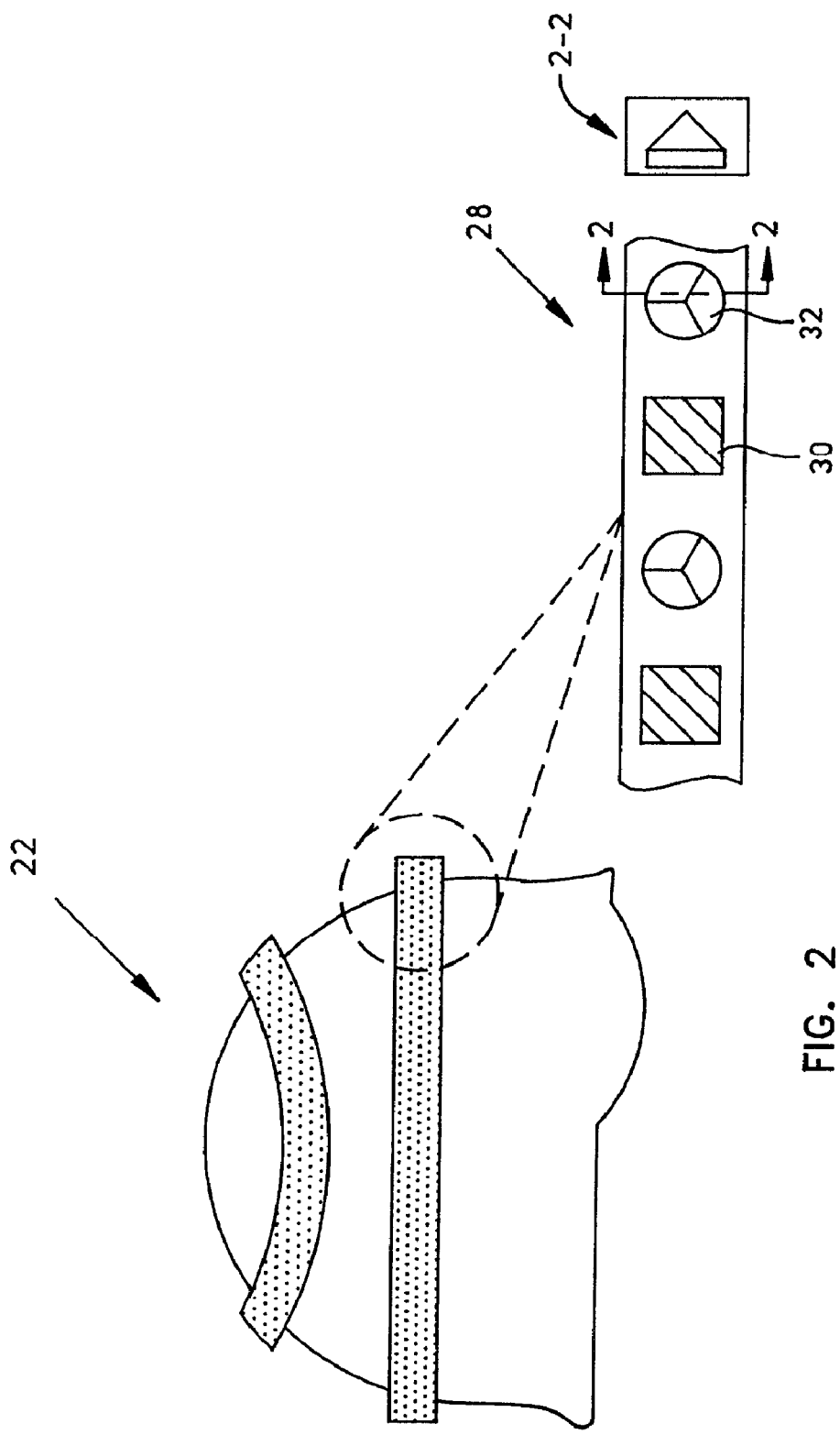
FIG. 2 is a sketch of the helmet-mounted combat response unit of this invention illustrating the IR sensor and retroreflector/obturator array.

FIG. 2 illustrates helmet-mounted response unit 22 in some additional detail, illustrating the IR sensor and retroreflector array 28 consisting of an IR sensor 30 and a retroreflector/obturator 32 in alternating disposition. Retroreflector/obturator 32 provides the precision return along the incoming path of any ray arriving from a direction within a 90 degree cone of coverage. Array 28 may include twelve sensors 30 and retroreflector/obturators 32, alternated to dispose one of each for every 50-degrees of azimuth, thereby providing the desired 360-degree hemispherical coverage from 90-degrees above the horizon to 30-degrees below the horizon. Array 28 is fixed to the response unit 22 by any useful means, such as, for example, rivets, cement or stitching (not shown), and may be oriented asymmetrically with respect to the vertical axis to enhance the desired hemispherical coverage above the horizon and down to 30 degrees below the horizon. The entire helmet-mounted response unit 22 weighs about 230 grams and requires no power except for the low-power electronic logic components described below in connection with FIGS. 4-5, which may be powered for up to 3 years by a small lithium-ion battery. All elements described in connection with the exemplary embodiment of response unit 22 are available as COTS products, including the necessary battery.

Retroreflector/obturator 32 may employ any useful retroreflector device known in the art, such as, for example, one of the line of Tech Spec™ Corner Cube Retroreflectors (Trihedral Prisms) available from Edmond Industrial Optics, Barrington, N.J. The obturator portion of retroreflector/obturator 32 may include a mechanical shutter device capable of cycling open and closed within a few milliseconds, or more preferably, a liquid crystal device (LCD) disposed over the retroreflector portion, such as the LCD-CDS92106 available from Cubic Defense Systems, San Diego, Calif.

Figure 3:
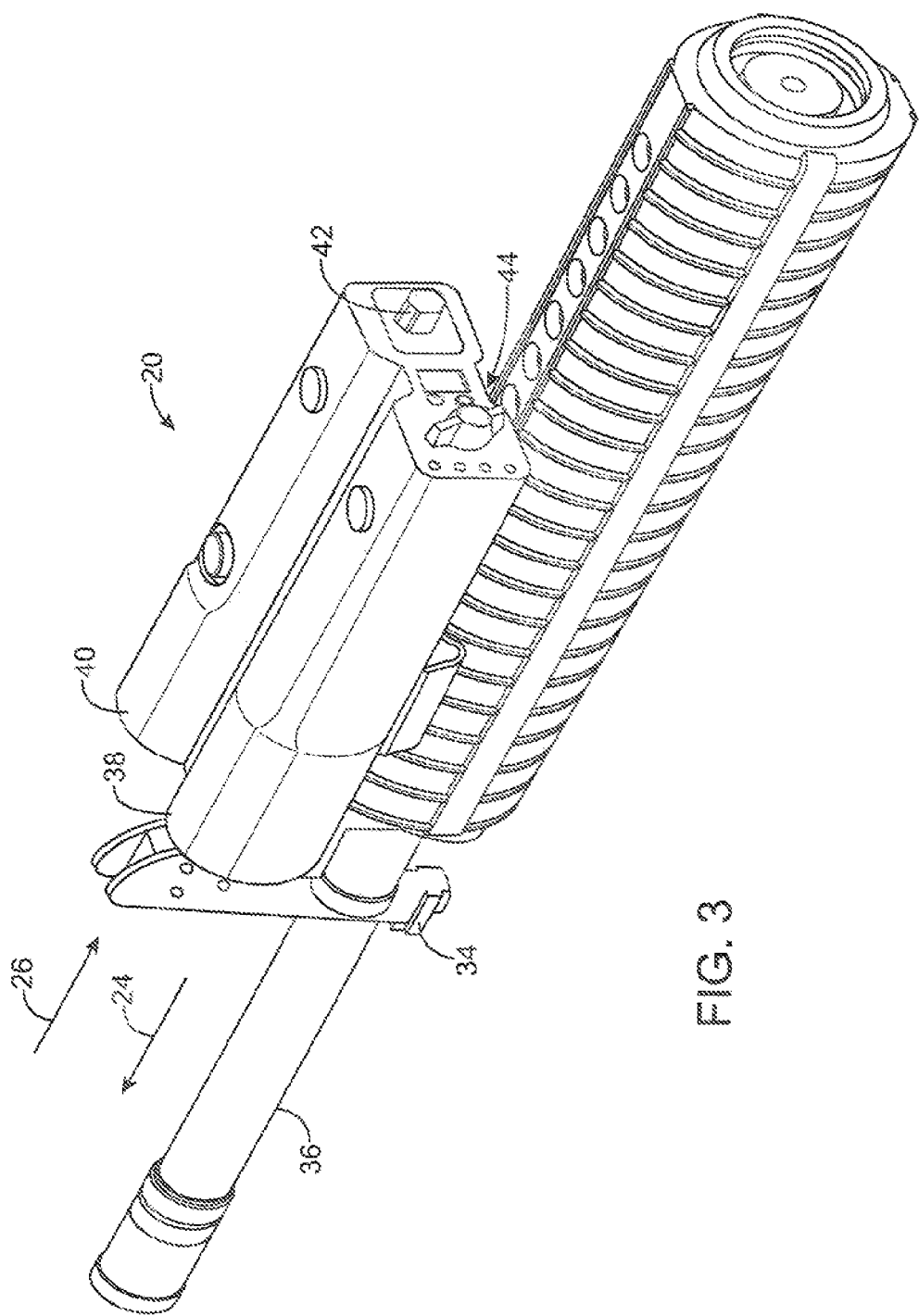
FIG. 3 is a sketch of the combat interrogatory unit of this invention illustrating a preferred weapon-mounted disposition thereof.

FIG. 3 illustrates interrogatory unit 20 in a preferred weapon-mounted disposition. Interrogatory unit 20 is removably fixed by a clamp 34 to a weapon barrel 36, which in use is removably fixed to a weapon carried by a dismounted soldier (FIG. 1), and includes an IR projector 38 for projecting IR transmit signal 24 and an IR receiver 40 for receiving response signal 26, which is a reflected portion of IR transmit signal 24. IR projector 38 may include, for example, a 1540 nm laser diode suitable for sharing with a laser range finder system such as the 750-Series laser rangefinder receivers available from Analog Modules, Inc., Longwood, Fla. IR projector 38 is preferably factory-aligned with IR receiver 40 for ease of boresighting and operation in the field. Interrogatory unit 20 may also include an IFF indicator 42 for indicating the results of an IFF challenge transaction, and a mode switch 44, for changing selected operating parameters, such as the IFF encoding scheme, signal timing, power on/off or IR projector wavelength, for example. Interrogatory unit 20 also includes a remote interrogation switch (not shown) that may be removably fixed to any convenient spot proximate the weapon trigger area (not shown) for convenient access during use for interrogation of unidentified response units. This remote interrogation switch may also include means for accepting biometric data (not shown, see FIG. 8) representing an operator fingerprint (or iris pattern or the like) for security purposes such as, for example, disabling (by a time-out timer) a captured unit to prevent unauthorized use by an enemy soldier. Provision may be made for either local battery or vehicle-cable power and/or for coupling to digital vehicle-systems for any useful purpose.

The two-way signal-to-noise budget for an IFF transaction may be appreciated with reference to the following example. A +44 dBm IR transmit signal level may be provided at 1540 nm by a commercial off-the-shelf (COTS) class-1 laser (25 watts). At an exemplary 1000 meter range limit, IR transmit signal 24 arrives at response unit 22 with a power of −8 dBm, having lost, for example, 52 dB en route through spreading, absorption and scattering losses. IR transmit signal 24 is then reflected by the appropriate retroreflector/obturator 32 and returned to IR receiver 40 with a −24 dB spreading loss (less than simple spherical spreading because of the retroreflector properties), a −3 dB obturator insertion loss, and scattering and absorption losses of less than −1 dB, leaving about −36 dBm at IR receiver 40, which is perhaps 8-10 dB above the noise threshold of an exemplary COTS laser detector, such as the Analog Modules No. 754 available from Analog Modules, Inc., Longwood, Fla. Even in a battlefield smoke and haze condition, the 1540 nm laser signal suffers only an additional −7.4 dB of scattering loss over the 1000 meter two-way path, leaving perhaps 1-3 dB of signal-to-noise ratio (SNR) margin in the IFF transaction of this example. The inventors have calculated link margins showing that IFF transactions are 99.5% successful in clear air at 1540 nm with a 5 dB margin (8 dB is needed for smoky haze).

Figure 4:
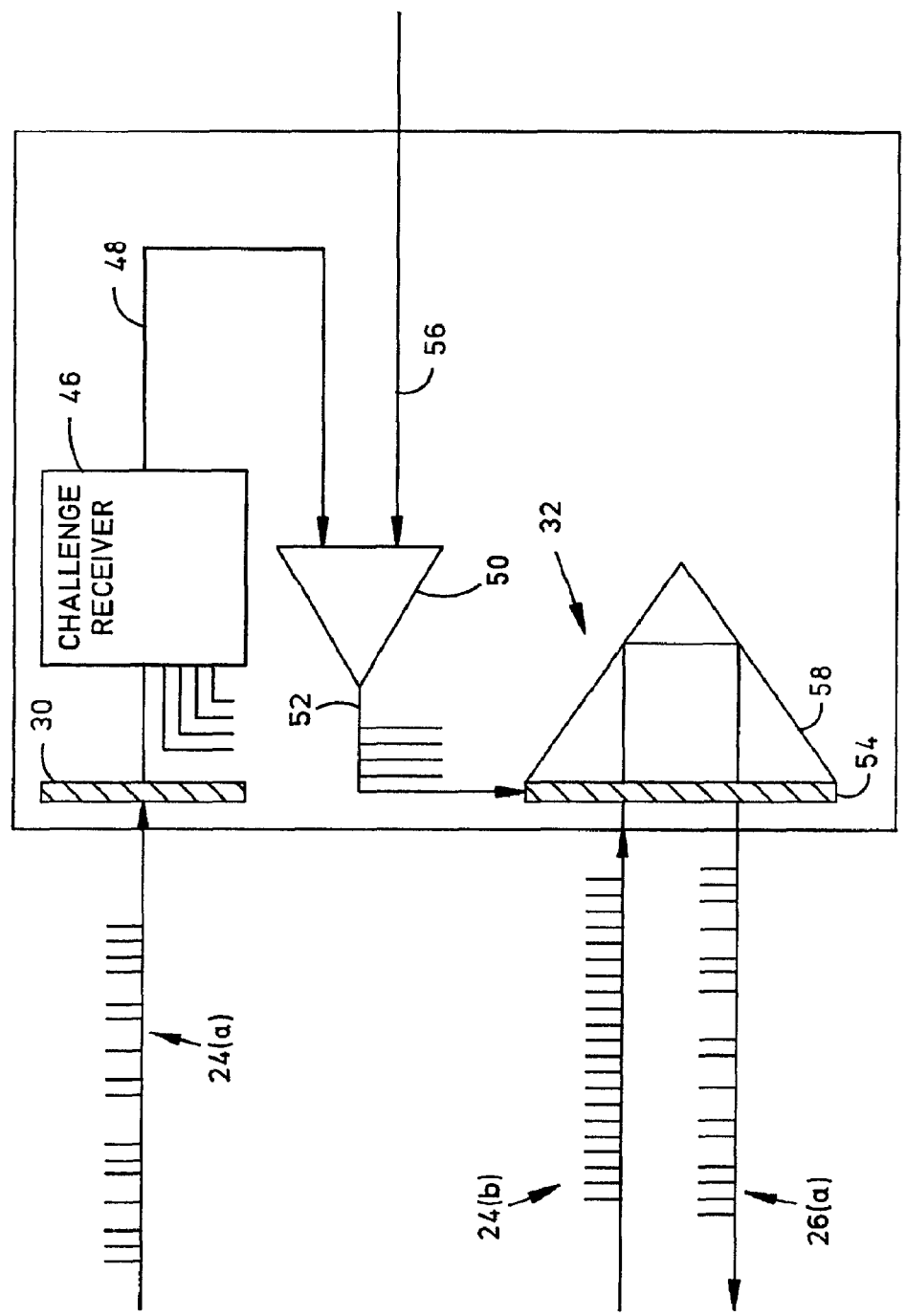
FIG. 4 is a schematic diagram illustrating the optical operation of the combat response unit of FIG. 2.

FIG. 4 is a schematic diagram illustrating the optical operation of response unit 22 (FIG. 2). As described in detail hereinbelow in connection with FIG. 7, transmit signal 24 (FIG. 1) includes a transmit code of the day (TCOD) including a frame-synchronization preamble (not shown) followed by a TCOD 24(a) followed by a TCOD interrogation pulse stream 24(b). In operation, TCOD 24(a) is received by one or more of the plurality of IR sensors 30 and presented to the challenge receiver 46 for verification. When TCOD 24(a) is verified, challenge receiver 46 produces a response code of the day (RCOD) signal 48, which includes a logical combination of selected information from TCOD 24(a) and from the local memory of challenge receiver 46 (not shown) that is described in detail hereinbelow. RCOD signal 48 is presented to the obturator driver 50, which produces an obturator signal 52 for opening and closing (making translucent and opaque) the obturator 54 in each of the plurality of retroreflector/obturators 32. A biometric identification (ID) signal 56 is also presented to obturator driver 50 to enable or disable operation thereof based on the verification of a scanned thumbprint input by the dismounted soldier in possession of helmet-mounted response unit 22, which is further described hereinbelow in connection with FIGS. 5 and 8(a)-(d). RCOD signal 48 includes a delay and a response pulse stream 26(a). The RCOD delay is sufficient to permit TCOD interrogation pulse stream 24(b) to arrive at reflector/obturator 32. Obturator 54 is then cycled open and closed in accordance with obturator signal 52 to produce response pulse stream 26(a) by reflecting selected elements of interrogation pulse stream 24(b) from the retroreflector 58 in at least one of the plurality of retroreflector/obturators 32.

Figure 5:
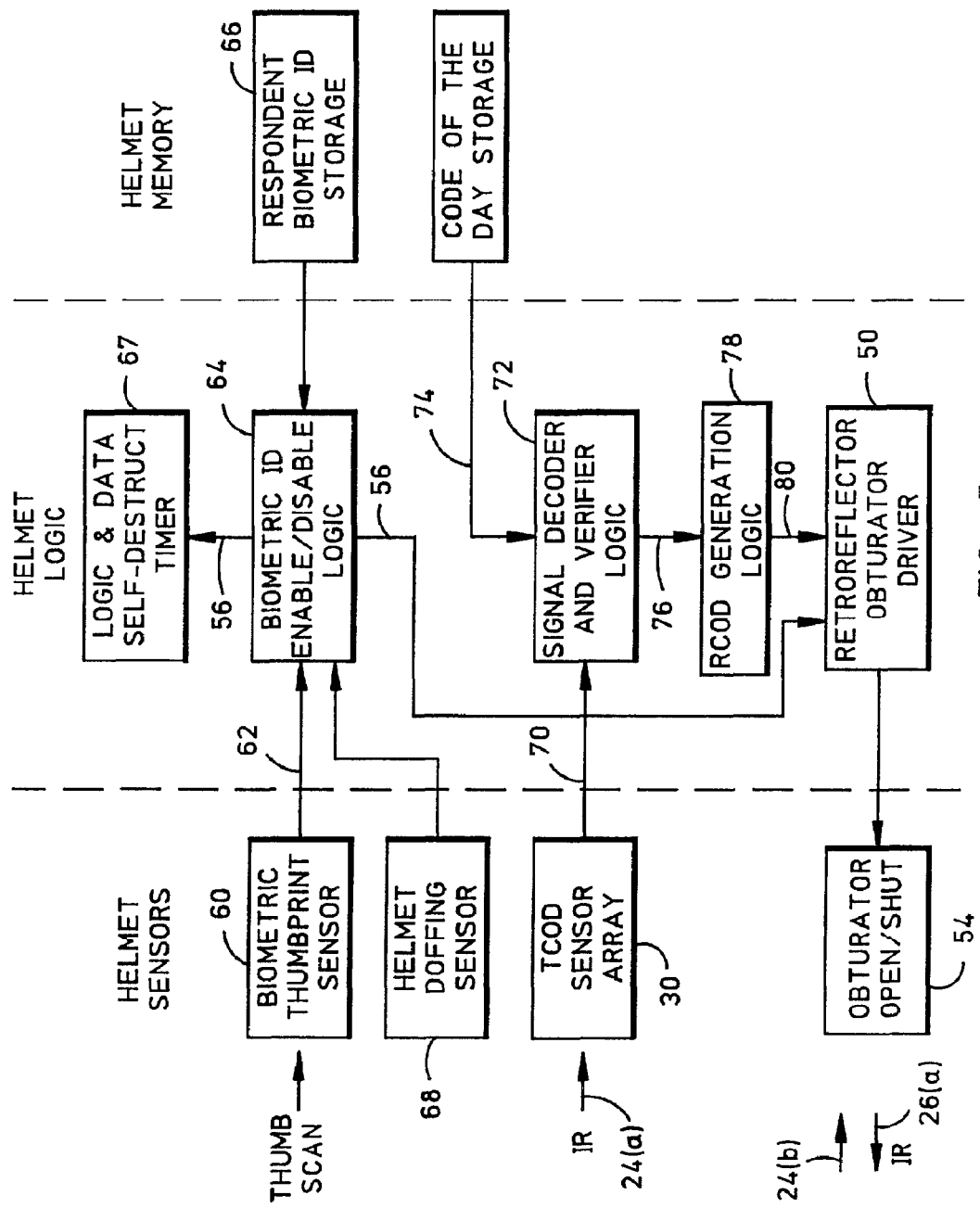
FIG. 5 is a schematic block diagram illustrating the detailed operation of the combat response unit of FIG. 2.

FIG. 5 is a schematic diagram illustrating the logical operation of response unit 22 (FIG. 2). The elements of FIG. 5 are arranged in three functional categories for clarity; (a) helmet sensors, (b) helmet logic and (c) helmet memory. In operation, helmet-mounted response unit 22 is first programmed with certain biometric data unique to the user and with a code of the day (COD), which includes a challenge code (CC) followed by a response code (RC). The helmet is then donned by the user according to a predetermined anti-spoofing protocol. The donning soldier first passes his/her thumb over a biometric thumbprint sensor 60 in a manner (known only to the soldier) for which response unit 22 has previously been programmed. Biometric thumbprint sensor 60 produces the coded biometric data stream 62, which is immediately evaluated by the biometric identification logic 64. This evaluation involves comparing data stream 62 to the earlier-stored thumbprint scan data 66 for the donning soldier to produce an enable/disable decision. If logic 64 decides that the thumbprint scan fails, the soldier may be afforded, for example, two additional opportunities to enable the helmet-mounted response unit by means of an audible or visual indicator (not shown). After two additional attempts, logic 64 decides that the biometric ID is invalid, and sets biometric ID signal 56 to "disable" obturator driver 50, permanently shutting obturator 54 to prevent any retroreflection. Moreover, biometric ID signal 56 may also be presented to a self-destruct timer 67, which begins a logic and memory self-destruction countdown. When completed, this countdown triggers the erasure of all logic and data stored in the helmet memory, thereby making a captured helmet-mounted response unit worthless to an enemy. The helmet electronics may easily be reprogrammed by the friendly forces for use in another combat exercise or the like.

After successfully completing a thumb scan and donning the helmet, biometric ID signal 56 is set to "enable" and obturator driver 50 is enabled so the soldier is thereafter equipped to passively respond to valid incoming interrogatory signals in the manner now described. When the soldier again doffs the helmet, the helmet-doffing sensor 68 immediately signals logic 64, which resets biometric ID signal 56 to "disable" and obturator driver 50 is again disabled, permanently shutting obturator 54 to prevent any retroreflection.

Figure 6:
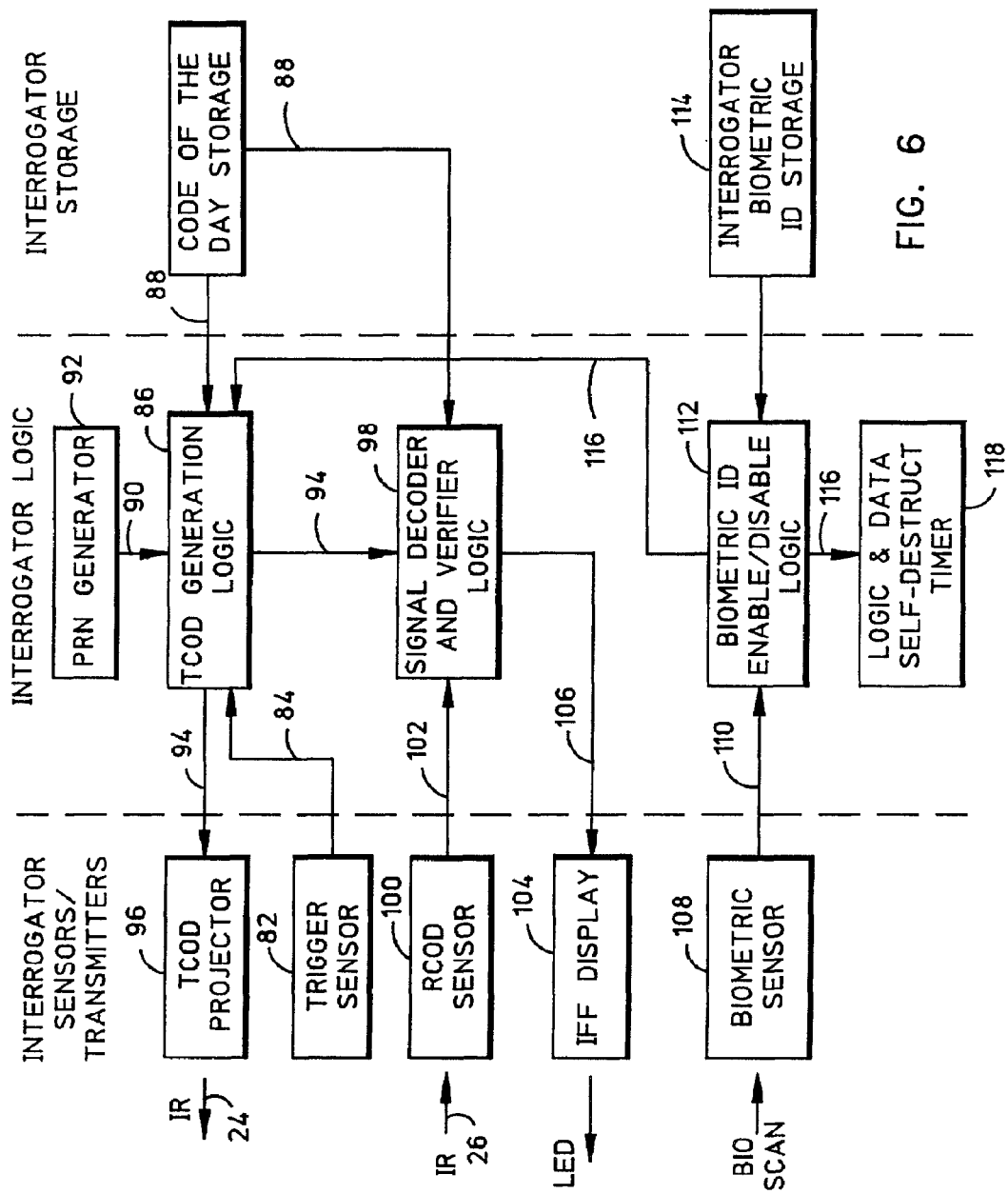
FIG. 6 is a schematic block diagram illustrating the detailed operation of the combat interrogatory unit of FIG. 3.

In use, response unit 22 first begins the IFF transaction upon the arrival of IR transmit signal 24 from interrogatory unit 20 (FIGS. 1 and 6). TCOD 24(a) is received by at least one IR sensor 30, which produces a signal 70 that is presented to the signal verification and decoding logic 72. The relative location on the helmet of the particular IR sensor 30 receiving the signal is identified in logic 72 to determine the arrival quadrant (Front, Right, Rear, or Left) of IR transmit signal 24. This arrival quadrant information may be used in logic 72, for example, to bias other IF processing parameters or to signal the helmeted soldier, by audible or visual means, of the arrival quadrant so that appropriate action may be undertaken (such as, for example, skeptical evasion of IFF interrogatories arriving from behind enemy lines). TCOD 24(a) is validated by examining it to verify that it includes a valid CC followed by a randomly-generated generated number (RGN). This is accomplished by comparing the received CC with the CC portion of the COD 74 stored in the helmet and accepting the RGN if the incoming CC matches the stored CC. The entire stored COD 74 and the incoming RGN are then passed as a data signal 76 to the response code of the day (RCOD) generation logic 78, which creates the RCOD 80 by combining the CC and RC portions of the stored COD with the PRN in a predetermined manner. After generation, RCOD 80 is passed to obturator driver 50 for use in opening and shutting obturator 54 accordingly. The first portion of RCOD 80 is a closed-shutter interval that is computed as a combination of the stored RC and the incoming RGN. The second portion of RCOD 80 is an open-shutter interval that is determined by some portion of the CC. RCOD 80 is synchronized to begin at a predetermined interval (such as 10 ms) after the end of the incoming TCOD so that the interrogator may evaluate RCOD 80 to verify that the reflecting response unit is a friend and not a foe, thereby completing the IFF transaction.

FIG. 6 is a schematic diagram illustrating the logical operation of interrogatory unit 20 (FIG. 3). The elements of FIG. 6 are arranged in three functional categories for clarity; (a) interrogator sensors/emitters, (b) interrogator logic and (c) interrogator memory. In use, interrogatory unit 20 first begins the IFF transaction when the trigger sensor 82 detects a command from the operator to interrogate a target. Trigger sensor 82 produces a signal 84 that is presented to the TCOD generation logic 86, which responsively retrieves a locally-stored copy of the COD 88 and a RGN 90 from a pseudorandom number (PRN) generator 92. TCOD generation logic 86 then combines the CC portion of COD 88 with RGN 90 to produce the TCOD portion of TCOD 94, which is then followed by the TCOD interrogation pulse stream. TCOD 94 is then amplified as necessary to drive the TCOD projector 96, which produces the IR transmit signal 24, initiated with the frame-synchronization preamble (not shown), and directs it to the target. TCOD is also presented to the signal decoder and verifier logic 98 for use in processing any incoming IR signals received at the IR sensor 100. When the TCOD portion of TCOD 94 is transmitted (see FIG. 7), logic 86 notifies logic 98 of the start of the response interval. Any incoming response signal 26 at RCOD sensor 100 produces a RCOD signal 102 that is presented to logic 98 for evaluation. Logic 98 reverses the encoding process discussed above in connection with FIG. 5 and below in connection with FIG. 7. RGN 90 and the RC from COD 88 are used to compute the proper closed-shutter interval, which is compared to the delay interval between completion of the transmission of TCOD 94 and the beginning of response pulse stream 26(a). The appropriate elements of COD 88 are then used to compute the proper open shutter interval, which is then compared to the actual length of the incoming response pulse stream 26(a). If the two comparisons are not successful, logic 98 does nothing; leaving the IFF display 104 inactive. When the comparisons are both successful, logic 98 produces an IFF indicator signal 106, which activates IFF display 104, thereby completing the IFF transaction. IFF display 104 may be a simple light-emitting diode (LED) indicator or an audible signal or any other useful indicator consistent with requirements for security and covertness.

As described above in connection with FIG. 5, interrogatory unit 20 may also include anti-spoofing means to prevent use by an enemy of a captured interrogatory unit. A biometric sensor 108 may be used to accept thumbprint or fingerprint input or retinal image input or any other useful biometric data unique to the authorized operator. Upon activation, biometric sensor 108 presents the incoming biometric data 110 to the biometric ID logic 112 for comparison to the biometric ID data 114 stored previously by the same soldier. If, at some point, logic 112 decides that the biometric ID is invalid, a biometric ID signal 116 is set to "disable" and TCOD generator logic 86 is disabled, permanently shutting down TCOD projector 96. Moreover, biometric ID signal 116 may also be presented to a self-destruct timer 118, which begins a logic and memory self-destruction count-down. When completed, this countdown triggers the erasure of all logic and data stored in the interrogator memory, thereby making a captured weapon-mounted interrogatory unit worthless to an enemy. The interrogator electronics may easily be reprogrammed by the friendly forces for use in another combat exercise or the like.

After successfully completing a biometric scan, biometric ID signal 116 is set to "enable" and TCOD generator logic 86 is enabled so the soldier is thereafter equipped to actively interrogate targets in the manner described above. After a predetermined period of inactivity, established by, for example, a simple timer (not shown), logic 116 resets biometric ID signal 116 to "disable" and TCOD generator logic 86 is again disabled, permanently shutting down TCOD projector 96.

Figure 7:
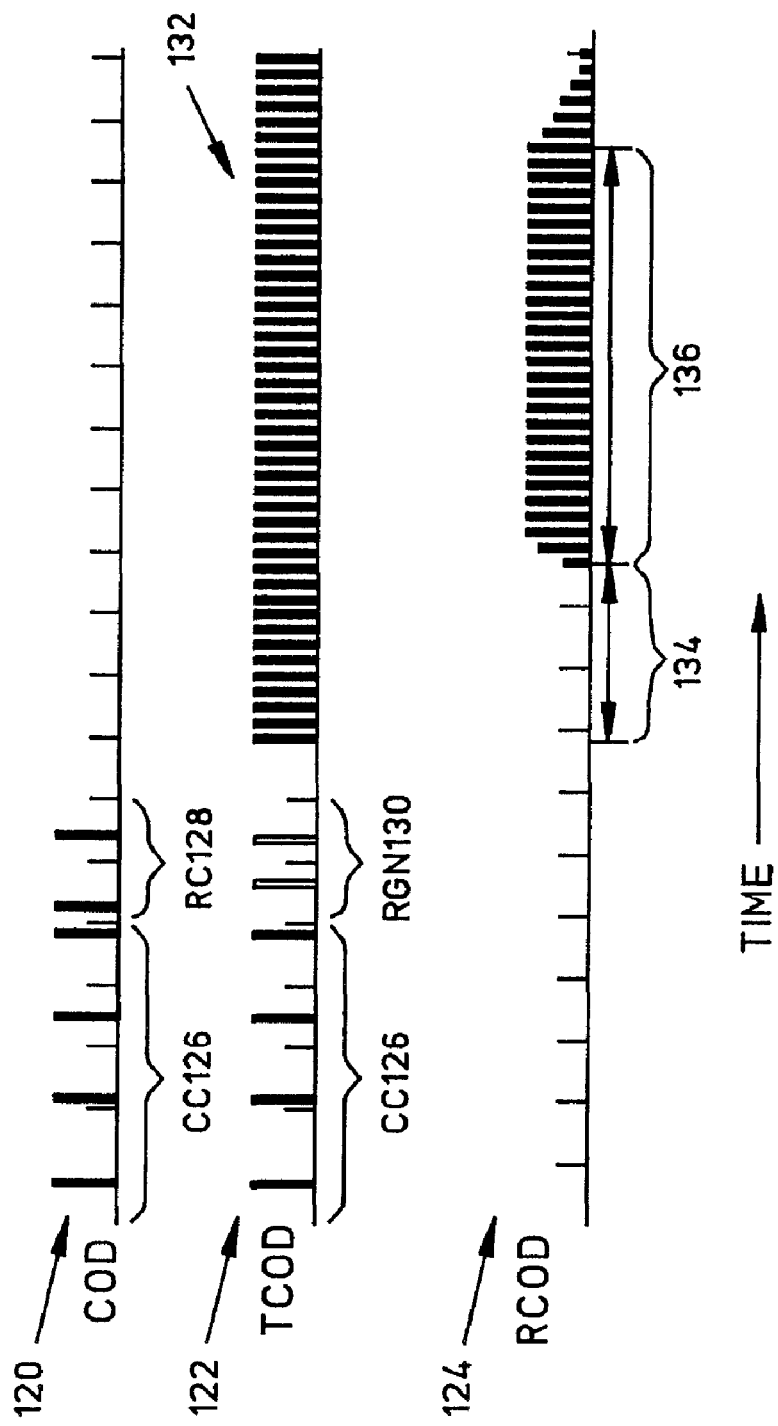
FIG. 7 is a chart illustrating the relationship between examples of the code of the day (COD), the transmitted code of the day (TCOD) and the response code of the day (RCOD) according to the method of this invention.

FIG. 7 is a chart illustrating the relationship between exemplary embodiments of the COD 120, the TCOD 122 and the RCOD 124 of this invention. Each of the six symbols of COD 120 and TCOD 122 are 7-bit values (ranging from 0-127) encoded as pulse positions within a 36 microsecond frame interval, which is established and synchronized for each IFF transaction by a three-pulse TCOD frame-synchronization preamble (not shown). Each pulse is 66.67 ns in duration, which allows the use of an inexpensive 15-MHz microprocessor (not shown) for implementing the various logic described herein. The position of a pulse within a frame represents the corresponding 7-bit symbol. COD 120 is changed daily and all interrogatory units and response units in an IFF system must be updated daily with the new COD 120. COD 120 includes a 4-symbol CC 126 and a 2-symbol RC 128. TCOD 122 includes CC 126 and a 2-symbol RGN 130 followed by a 10-ms buffer interval followed by TCOD interrogation pulse stream 132 consisting of a 50 ms stream of 1-ms spaced pulses. RCOD 124 includes a delay 134 during the closed-shutter interval followed by a response pulse stream 136 during the open shutter interval. Delay 134 is computed by dividing the absolute value of the difference between RGN 130 and RC 128 by ten and adding 10 ms, providing a range of values from 10-20 ms in 1 ms steps. This coding method is both secure and covert because RGN 130 is shared only by the interrogator and target even though COD 120 is known by all friendlies. Although interception of RGN 130 is unlikely because of the narrow TCOD beam (3 milliradians), any such interception is useless without prior knowledge of COD 120 because RC 128 is not transmitted and both RC 128 and RGN 130 are required to compute delay 134. The open shutter interval that reflects response pulse stream 136 is computed in milliseconds by adding three times the fourth digit of CC to five, giving a range of values from 5 to 32 ms in 3 ms steps.

Thus, the duration of response pulse stream 136 cannot be spoofed without prior knowledge of COD 120 or interception of TCOD 122 and the duration of delay 134 cannot be spoofed without having both the prior knowledge of COD 120 and the successful interception of TCOD 122. Such spoofing also presumes prior knowledge of the decoding algorithms described above. Each IFF transaction is completed within 60 ms. An interrogator may repeat an interrogation as desired to reduce the probability of false negatives. Assuming that interrogation is repeated up to four times before accepting a negative (partial response) result, the entire IFF transaction is completed within 250 ms. This method of obtaining a response is necessary only under extreme scintillation and range conditions, at the limits of link performance.

Figure 8:
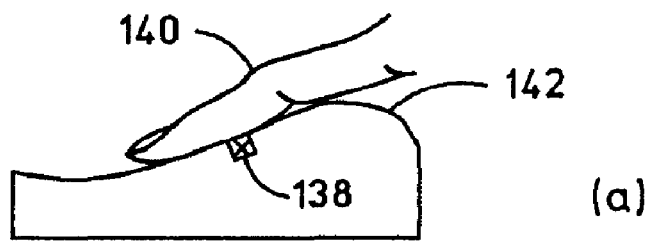
FIGS. 8(a)-(d) are sketches illustrating several examples of the means for accepting biometric data employed in the combat response unit of FIG. 2.
Figure 8:
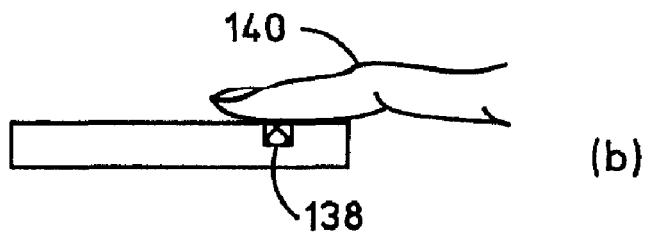
Figure 8:
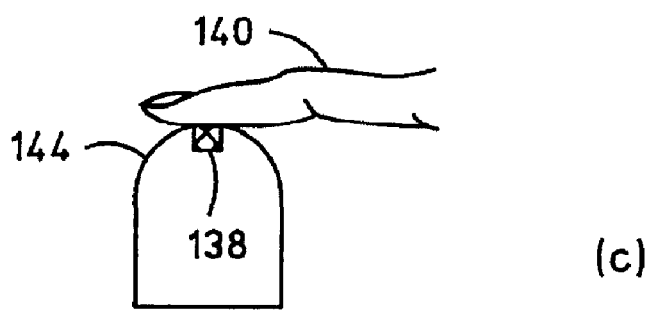
Figure 8:
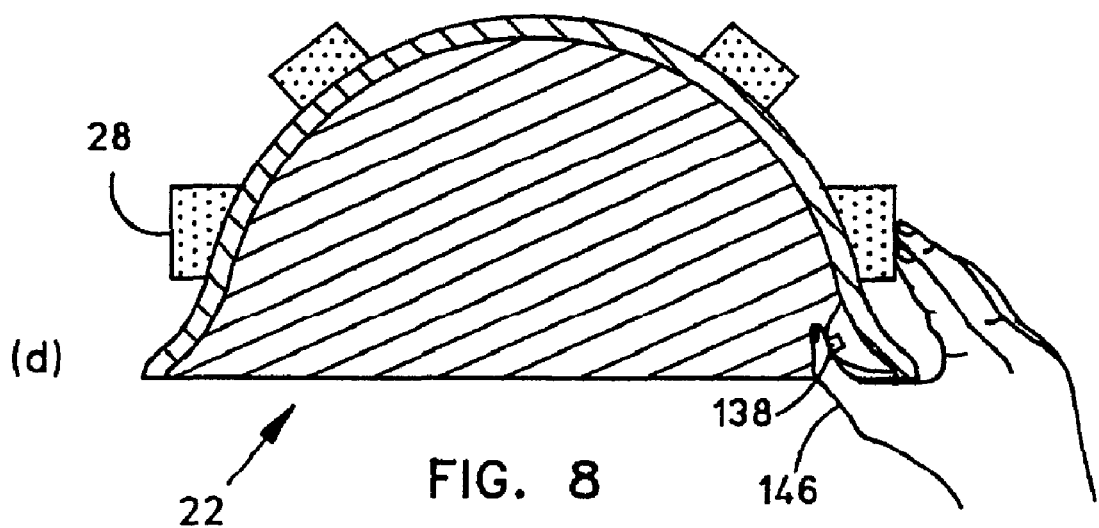

FIGS. 8(*a*)-(*d*) show several examples of suitable means for accepting biometric data for helmet-mounted response unit 22 described above in connection with FIGS. 2 and 5. One suitable device for accepting biometric fingerprint or thumbprint data is the FCD4B14 FingerChip™ available from AtMel Corporation, San Jose, Calif. As depicted in FIG. 8(*a*), the print sensor 138 is disposed such that a finger 140 may be drawn across print sensor 138 while in continuous contact therewith. Continuous contact is important and is facilitated by providing a curved surface 142 generally as shown. As finger 140 moves over print sensor 138, a stream of digital biometric data is produced by print sensor 138 and presented on a data bus (not shown) for manipulation by microprocessor-controlled logic (not shown). Clearly the exact biometric data stream depends not only on the fingerprint but on the direction and manner in which finger 140 is drawn across print sensor 138. This is an important feature of this invention because it adds considerable security to helmet-mounted response unit 22 in that the availability of the proper finger or thumb alone is insufficient to satisfy the biometric security requirement; the user must also recall and repeat with reasonable accuracy the exact manner in which the thumb or finger was drawn across print sensor 138 when first storing the user's biometric ID data in response unit 22.

FIG. 8(*b*) shows another mounting arrangement suitable for print sensor 138, although the curved surface 142 is preferable. FIG. 8(*c*) shows yet another example employing the curved surface 144, which importantly permits continuous contact between finger 140 and print sensor 138 while moving thereover.

FIG. 8(*d*) demonstrates an exemplary arrangement for placing print sensor 138 within helmet-mounted response unit 22 so that the user may draw the thumb 146 over print sensor 138 while grasping helmet-mounted response unit 22 preparatory to donning same. Any useful audio and/or visual indicator means (not shown) may be provided to inform the user that helmet-mounted response unit 22 has been successfully activated, thereby affording the opportunity to retry activation by repeating the movement of thumb 146 across print sensor 138. If desired, a the repeated attempts may be accumulated against a limited number followed by self-destruction of all logic and data stored in helmet-mounted response unit 22.

In an alternative embodiment of helmet-mounted response unit 22, the biometric data necessary to identify several members of a combat unit may be stored in biometric ID storage 66 (FIG. 5) so that any combat unit member may activate helmet-mounted response unit 22. This permits a member of the combat unit to "borrow" the helmet and its response unit 22 (FIG. 2) from another member of the same combat unit and successfully activate it for use in the battlefield. The size of the group of authorized users is limited only by the memory available in biometric ID storage 66, which may be loaded by mass-transfer of digital data collected from the thumb-scans of all members of the combat unit. Similarly, in an alternative embodiment of interrogatory unit 20, the biometric data necessary to identify several members of a combat unit may be stored in biometric ID storage 114 (FIG. 6) thereby permitting a member of the combat unit to "borrow" the weapon and response unit 22 (FIG. 2) from another member of the same combat unit and successfully activate it for use in the battlefield.

Figure 9:
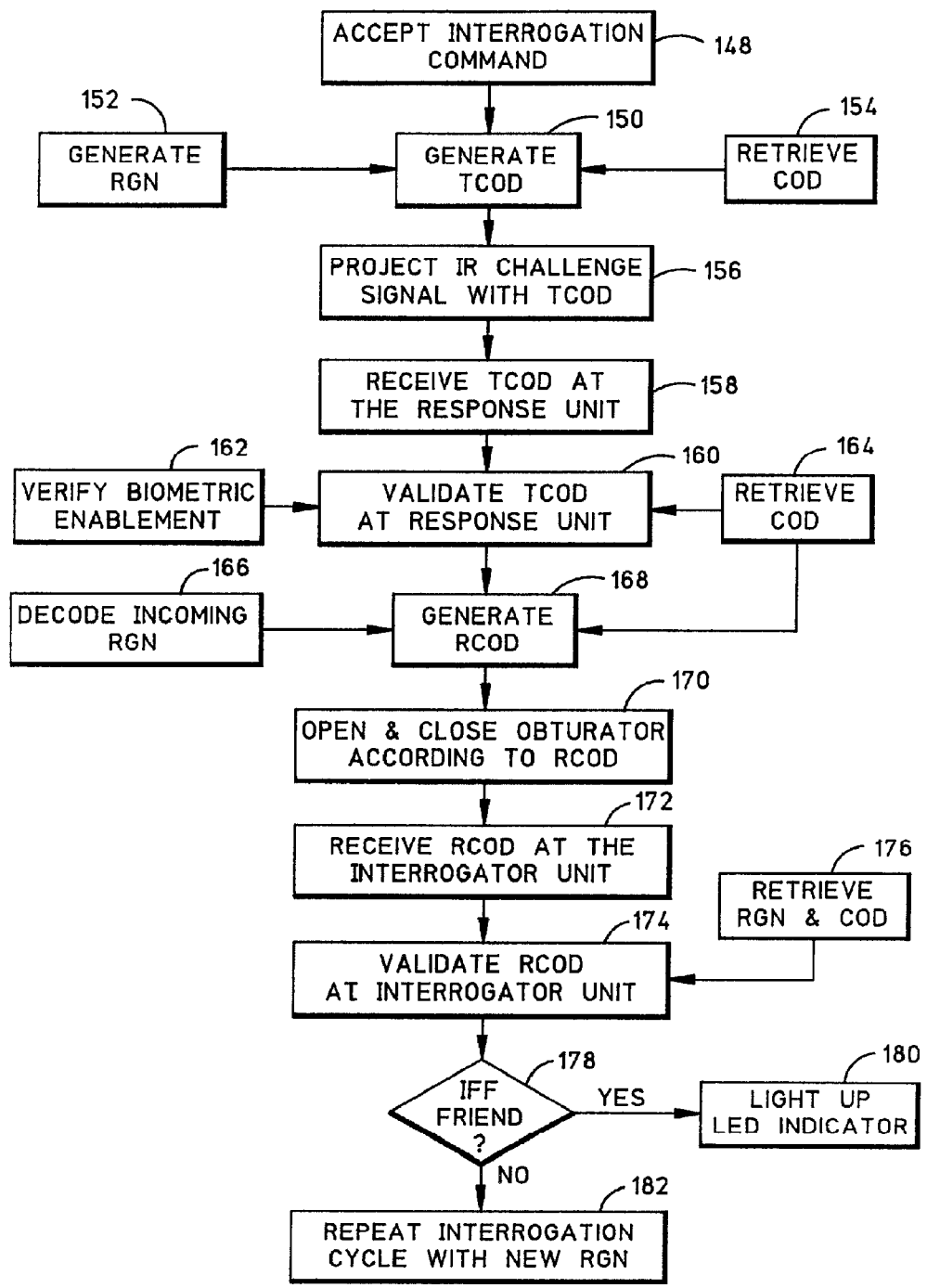
FIG. 9 is a block diagram of a flow chart illustrating the IFF method of this invention.

FIG. 9 is a block diagram showing a flow chart exemplifying the IFF transaction method of this invention. This process begins with the step 148 where the interrogating soldier triggers an interrogation command at interrogatory unit 20 (FIGS. 1, 3 and 6). In the step 150, a TCOD is created by accepting the RGN produced in the step 152 and the COD retrieved from local memory in the step 154. In the step 156, an IR transmit signal encoding the TCOD is projected to the targeted response unit. In the step 158, the TCOD is received at the targeted helmet-mounted response unit. More precisely, the 3-pulse frame-synch preamble and the first six symbols of the TCOD are first received and decoded in step 158, which may also include an arrival quadrant indication step (not shown) to notify the helmet wearer by some useful means of the quadrant (Front, Right, Rear, or Left) from which the received TCOD has arrived. In the step 160, the received TCOD is validated by first verifying that the biometric security has been satisfied in the step 162 and then retrieving from local storage the COD in the step 164. As described above in connection with FIG. 7, the CC (the first four symbols from the COD) is compared with the CC from the received TCOD and, if matched, the next two symbols of the received TCOD are decoded as the RGN in the step 166. In the step 168, the RGN from step 166 and the RC (the fifth and sixth symbols of the COD) are used to compute the closed shutter interval (the delay interval) of the RCOD and the fourth symbol of the COD is used to compute the open shutter interval (the response pulse stream) of the RCOD. In the step 170, the RCOD from step 168 is used to cycle the obturator, thereby retroreflecting the interrogatory pulse stream portion of the TCOD according to the RCOD.

In the step 172, the RCOD is received and decoded at the interrogatory unit and validated in the step 174, which uses the locally-stored RGN and COD retrieved in the step 176 to duplicate the computations used to create the RCOD at the response unit and to compare the received RCOD with the locally-computed RCOD. In the step 178, the results of step 174 are evaluated to make a friend or foe decision, completing the IFF transaction initiated in step 148. If Friend, then the step 180 signals the interrogatory unit user in some useful manner, such as lighting up an LED for a short time. If Foe, then the step 182 initiates a repetition of the IFF transaction (with a new RGN) or does nothing, thereby indicating that the IFF transaction has failed to identify a friend.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

What is claimed is:

1. A combat interrogatory unit for use in a combat identification as friend or foe (IFF) communications system, the combat interrogatory unit comprising:
   projector means for projecting an infrared (IR) transmit signal including a transmitted code of the day (TCOD) encoded as pulse positions within a predetermined frame interval;
   means for determining a proper closed-shutter interval of an expected response to the projected IR transmit signal based on the TCOD and at least one datum not included with the TCOD, said closed-shutter interval being variable according to the TCOD;
   receiver means for receiving a reflected IR transmit signal including a response code of the day (RCOD); and
   means for identifying a source of the reflected IR transmit signal as friend or foe,
   wherein the source is identified as friend or foe based on a comparison between the closed-shutter interval of the expected response and a corresponding delay interval of the RCOD.

2. The unit of claim 1 further comprising:
   means for combining a first stored code of the day (COD) with a randomly-generated number (RGN) to produce the TCOD.

3. The unit of claim 2 further comprising:
   means for fixing the projector means and the receiver means to a weapon.

4. The unit of claim 1 further comprising:
   means for fixing the projector means and the receiver means to a weapon.

5. A combat interrogatory unit for use in a combat identification as friend or foe (IFF) communications system, the combat interrogatory unit comprising:
   a projector for projecting an infrared (IR) transmit signal including a transmitted code of the day (TCOD) encoded thereon;
   a controller configured to determine a proper closed-shutter interval and a proper open-shutter interval of a response to the projected IR transmit signal based on the TCOD and at least one datum not included with the TCOD, said closed-shutter interval and open-shutter interval being variable according to a value of the TCOD; and
   a sensor configured to receive a reflected IR transmit signal amplitude modulated with a response code of the day (RCOD),
   wherein the controller is configured to identify a source of the reflected IR transmit signal as friend or foe based on a comparison between:
      the closed-shutter interval and a corresponding delay interval of the RCOD;
      the open-shutter interval and a corresponding length of an incoming pulse stream of the RCOD;
   or both.

6. A method for identifying, as friend or foe, a combat response unit, the method comprising:
   projecting an infrared (IR) transmit signal including a transmitted code of the day (TCOD) encoded as pulse positions within a predetermined frame interval onto the combat response unit from a combat interrogatory unit;
   determining a proper closed-shutter interval and a proper open-shutter interval of a response to the projected IR transmit signal based on the TCOD and at least one datum not included with the TCOD, said closed-shutter interval and open-shutter interval being variable according to a value of the TCOD;
   receiving at the combat interrogatory unit a reflected IR transmit signal modulated according to a response code of the day (RCOD); and
   identifying a source of the reflected IR transmit signal as friend or foe based on a comparison between:
      the closed-shutter interval and a corresponding delay interval of the RCOD;
      the open-shutter interval and a corresponding length of an incoming pulse stream of the RCOD;
   or both.

7. The method of claim 6, further comprising combining a first code of the day (COD) stored at the combat interrogatory unit with a randomly-generated number (RGN) to produce the TCOD.

8. The method of claim 6, further comprising combining generating an arrival quadrant signal representing the direction of arrival of the IR transmit signal at the combat response unit.

9. A method for identifying a combat response unit, the method comprising:
   receiving at the combat response unit, a challenge code (CC) and a response code (RC);
   storing the CC and the RC;
   receiving at the combat response unit, an infrared (IR) transmit signal including a transmitted code of the day (TCOD) encoded as pulse positions within a predetermined frame interval;
   authenticating the TCOD based on a valid CC followed by a randomly-generated number (RGN);
   determining a closed-shutter interval, based on the combination of a stored RC and the RGN, corresponding to a response code of the day (RCOD); and
   selectively reflecting the IR transmit signal to modulate the reflected signal by opening and closing a retroreflector obturator in accordance with the closed-shutter interval of the response code of the day (RCOD) when the first portion of the TCOD is authenticated.

10. The method of claim 9, further comprising combining the received TCOD with a code of the day (COD) stored at the combat response unit to produce the RCOD.

11. The method of claim 9, further comprising:
   accepting biometric data at the combat response unit; and
   activating the combat response unit responsive to the biometric data.

12. The method of claim 9, wherein the combat response unit comprises a helmet-mounted challenge receiver, and the method further comprising deactivating the combat response unit responsive to a doffing of the helmet.

13. The unit of claim 1, further comprising:
   means for determining an expected open-shutter interval for the RCOD based on the TCOD and the at least one datum not included with the TCOD; and
   means for determining a corresponding length of an incoming pulse stream of the RCOD received at the receiver means,
   wherein the source of the reflected IR transmit signal is identified as friend or foe based on the expected open-shutter interval for the RCOD and the corresponding length of an incoming pulse stream of the RCOD received at the receiver means.

14. The unit of claim 5, wherein the closed-shutter interval corresponds to an absence of modulation of the IR transmit signal and the open-shutter interval corresponds to a period in which the IR transmit signal is modulated.

15. The method of claim 6, wherein the closed-shutter interval corresponds to an absence of modulation of the IR transmit signal and the open-shutter interval corresponds to a period in which the IR transmit signal is modulated.

* * * * *